Aug. 18, 1931.　　　M. H. BENNETT　　　1,819,588
TEMPERATURE CONTROL SYSTEM AND APPARATUS
Filed Feb. 20, 1929
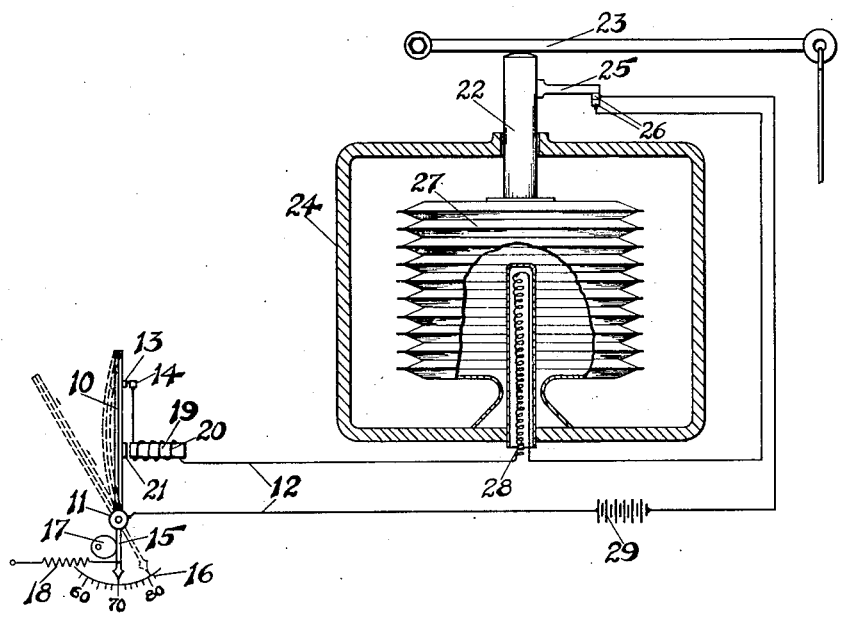
Inventor
Morris H. Bennett
By his Attorneys
Philipp, Sawyer, Rice & Kennedy Patented Aug. 18, 1931

1,819,588

UNITED STATES PATENT OFFICE

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT

TEMPERATURE CONTROL SYSTEM AND APPARATUS

Application filed February 20, 1929. Serial No. 341,379.

This invention relates broadly to improvements in controlling means and more particularly to improvements in temperature controlling systems and apparatus.

The present systems for automatically controlling temperatures within rooms or other places include means responsive to temperature for regulating apparatus supplying heat. In the usual form of system, a temperature responsive member is used for controlling an electric circuit which, in turn, regulates the heating apparatus. The temperature responsive member functions to open and close the circuit in correspondence therewith and the circuit regulates the heating apparatus so as to maintain the temperature at the desired degree.

Difficulty has been experienced with this type of system due to the fact that the temperature responsive member controlling the electric circuit constantly flutters under the influence of small temperature changes and opens and closes the electric circuit in a rapid periodic manner, irrespective of whether the apparatus for supplying the heat has been changed or in any way regulated. Another difficulty is the arcing resulting when the contacts separate.

My present invention aims to improve apparatus of this character and to provide in combination therewith means for maintaining the temperature responsive member in a given position until after the heating apparatus has functioned. By the provision of such means, constant fluttering or vibrating movements of said member are eliminated.

Another object of the invention is to eliminate arcing upon separation of the contacts.

My invention is further intended to produce an apparatus which cannot be damaged due to extreme changes in temperature and abnormal responses of the apparatus due thereto.

Other objects, features and advantages of the invention will appear as the description proceeds.

In the drawing, the single figure is a diagrammatic view of a system and apparatus constructed in accordance with and embodying the present invention.

Referring to the drawing in detail, there is shown a temperature responsive member 10 which may be composed of two or more adjacent linear strips of metal having different coefficients of expansion, and preferably is the usual bi-metallic strip commonly employed. The bi-metallic strip is pivoted at 11 and is adapted for movement on its pivot and for flexing movement so as to open or close an electric circuit 12 in which it is included. The bi-metallic strip carries a contact 13 which moves with it and cooperates with a stationary contact 14 whereby movement of the strip causes the contacts to engage or separate and thereby to close or open the circuit through the strip. The strip preferably carries a pointer 15 which moves with it. The pointer shown extends in the opposite direction to the strip and cooperates with a scale 16 which indicates temperature in degrees Fahrenheit. The position of the bi-metallic strip and its pointer may be controlled by means such as a cam 17 which is manually operated in any desired manner. The strip and pointer may be adjusted by cam 17 and the pointer caused to assume the desired position at which the temperature is to be maintained. The cam may bear against one side of the pointer, as shown, and a light spring, as indicated at 18, may also be used for the purpose of keeping the pointer in contact with the cam.

Under changes of temperature, the thermostatic strip 10 moves to separate or engage the contacts 13 and 14 and consequently to open or close the circuit 12 which, in turn, controls the operation of the heating apparatus as presently described. An electromagnet comprising a core 19 which is energized by a winding 20 in the circuit 12 is preferably used as the means for maintaining the contacts 13 and 14 engaged until such time as the heating apparatus has been regulated. The core attracts the thermostatic strip 10 and, for this purpose, the strip may have a magnetic member 21 serving as an armature.

The current in the circuit 12 is utilized to regulate the heating apparatus. In the illustrated embodiment, a movable member 22 such as a rod is employed for actuating a lever 23 which regulates the draft of the furnace. The movable member is operated as by a bellows 27 to which it is connected and which contains a gas, and a resistor or heating element 28 in circuit 12. A casing 24 may contain the bellows and the movable member extends through an opening in the casing and may work back and forth therein. The movable member carries an arm 25 with the movable switch contact of a pair of contacts 26 included in the circuit 12. The circuit is provided with a source of current, such as a battery 29.

In the operation of the improved system and apparatus, the temperature to be maintained is first predetermined by setting the pointer 15 at the corresponding division on the scale 16, thus spacing the contacts 13 and 14 the proper amount. The adjustment is made by the cam 17 or other means employed. The temperature is maintained at the predetermined degree automatically by the improved apparatus which functions to regulate the heating apparatus by changing the draft and to supply more or less heat as the temperature decreases or increases below or above the predetermined amount. The draft is normally closed and the heating apparatus is not supplying sufficient heat to maintain the predetermined temperature. The circuit 12 is normally broken by the spacing of contacts 13 and 14, the bellows are contracted and as a consequence the movable member 22 is lowered and contacts 25 and 26 are in engagement. Upon decrease of the temperature, the bi-metallic strip 10 flexes until the contact 13 engages the contact 14 completing the circuit 12. Current then flows in the circuit and the resistor is heated, causing the gas within the bellows to expand and the bellows also to expand. The movable member 22 consequently is moved by the bellows and operates the draft lever 23 so as to increase the draft of the furnace and supply more heat to the room to raise the temperature thereof. The circuit being completed, the coil 20 is energized, attracts the bi-metallic strip and causes the contacts 13 and 14 to remain engaged until the movable member has responded and changed the draft. Upon movement of the movable member, the contacts 26 disengage, break the circuit 12 and cause deenergization of electromagnet 20. The bi-metallic strip is then no longer attracted and may move in response to temperature conditions. The bi-metallic strip is thus held attracted and the contacts 13 and 14 in engagement until the draft has been operated.

When resistor 28 has no current flowing through it, the gas in the bellows cools and the bellows contract, the movable member 22 is allowed to fall back into its original position and the draft lever is again permitted to close the draft. The heating apparatus thus assumes its original position. Due to the increase in temperature caused by the increased draft of the heating apparatus, the bi-metallic strip has flexed back to its normal position and remains in that position until the temperature again decreases when the operation described is resumed.

These operations occur automatically, the heating apparatus is automatically regulated, and the temperature is maintained substantially constant at all times.

In temperature control arrangement heretofore known, whenever the temperature was lowered considerably below the normal, as, for example, when the building was vacant, the bi-metallic strip 10 flexed very decidedly and forced contacts 13 and 14 into firm engagement. There was, therefore, a strain on the strip tending to bow it outwardly, as shown in dotted lines in the drawing. This bowing out of the strip tended to swing pointer 15 to the right. In prior constructions, this tendency of the pointer to swing was opposed by the setting device to which it was attached, and, consequently, considerable damage was done to the instrument. With the arrangement shown, pointer 4 may move freely to the right. In order to insure the return of the pointer and to hold it against the adjusting cam under normal conditions, the light spring 18 has been provided.

If, on the other hand, the temperature increases, the bi-metallic strip swings to the left, as shown in dotted lines in the drawing, away from the contact 14. Its motion being unimpeded, it tends to pivot about pin 11, thereupon swinging pointer 15 again to the right, in which direction it may freely move.

It is thus evident that for either extreme of temperature, with the construction shown, no damage can be sustained by the abnormal response of the instrument, as the pointer moves freely without opposition.

It should also be noted that no current is flowing in the circuit when the thermostatic contacts are expanded, as the circuit is broken by contacts, 26. There is consequently no arcing in the separation of the thermostatic controls.

It will be appreciated that the specific details are shown by way of illustration and example, and the invention is capable of wide variations in constructional embodiments.

What is claimed is:

1. A temperature controlling system, comprising means responsive to changes in temperature, an electric circuit controlled by said means, heat regulating apparatus controlled by the circuit, said apparatus including a movable member, a bellows having an expansible gas, and a resistor within the bellows and in the circuit, means in the circuit acting to maintain the temperature responsive means in circuit closing position upon current flow in the circuit, and a pair of contacts in the circuit, one of the contacts being movable and carried by the movable member.

2. A temperature controlling system comprising a controlling circuit, a linear thermostatic strip for controlling the circuit, said strip carrying a contact for cooperating with a stationary contact in the circuit, an indicating pointer associated with the strip, means for pivotally mounting the strip and pointer, said pointer being disposed on the side of the pivot opposite the strip, means for positioning the strip and pointer angularly about said pivot to adjust the spacing of the contacts, said positioning means being located adjacent the pointer and on the side opposite to the contacts to permit movement of the pointer away from the positioning means.

In testimony whereof, I have hereunto set my hand.

MORRIS H. BENNETT.